Sept. 24, 1968  H. NERWIN  3,402,811
SORTING APPARATUS FOR FILM CARTRIDGES
Filed Feb. 17, 1967  5 Sheets-Sheet 1

INVENTOR.
HUBERT NERWIN
BY
ATTORNEYS

Sept. 24, 1968    H. NERWIN    3,402,811
SORTING APPARATUS FOR FILM CARTRIDGES
Filed Feb. 17, 1967    5 Sheets-Sheet 2

INVENTOR.
HUBERT NERWIN
BY
ATTORNEYS

Sept. 24, 1968 H. NERWIN 3,402,811
SORTING APPARATUS FOR FILM CARTRIDGES
Filed Feb. 17, 1967 5 Sheets-Sheet 3

INVENTOR.
HUBERT NERWIN
BY
ATTORNEYS

Sept. 24, 1968    H. NERWIN    3,402,811
SORTING APPARATUS FOR FILM CARTRIDGES
Filed Feb. 17, 1967    5 Sheets-Sheet 4

INVENTOR.
HUBERT NERWIN
BY
ATTORNEYS

Sept. 24, 1968   H. NERWIN   3,402,811
SORTING APPARATUS FOR FILM CARTRIDGES
Filed Feb. 17, 1967   5 Sheets-Sheet 5
FIG. 6
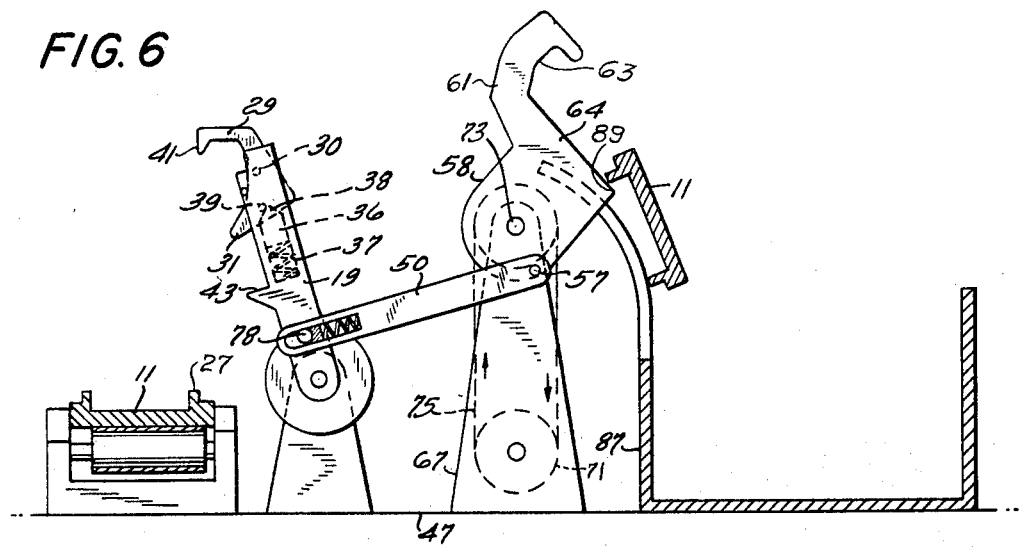
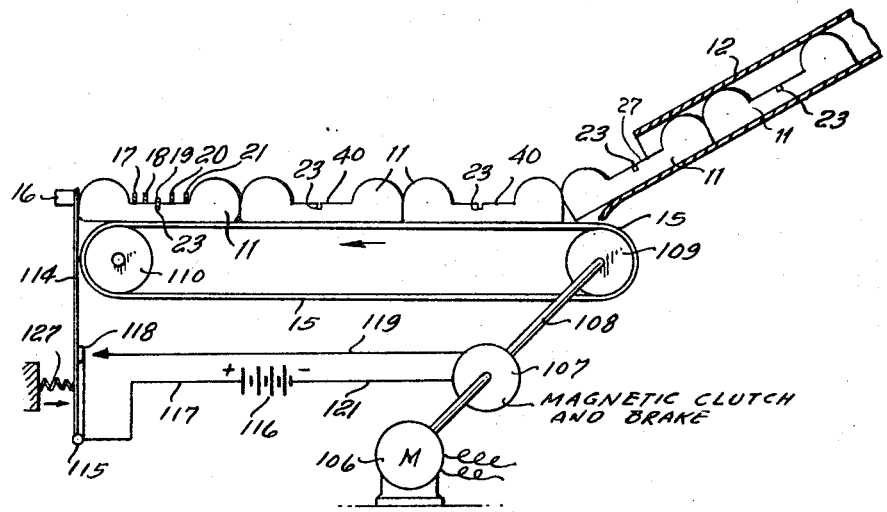
FIG. 7
INVENTOR.
HUBERT NERWIN
BY
ATTORNEYS United States Patent Office 3,402,811
Patented Sept. 24, 1968

3,402,811
SORTING APPARATUS FOR FILM CARTRIDGES
Hubert Nerwin, Rochester, N.Y., assignor to Eastman Kodak Company, Rochester, N.Y., a corporation of New Jersey
Filed Feb. 17, 1967, Ser. No. 616,916
9 Claims. (Cl. 209—74)

ABSTRACT OF THE DISCLOSURE

For automatically sorting film cartridges in accordance with the position of an identifying notch placed in the outer surface thereof to identify the contents of the cartridge, an apparatus is provided which moves a group of cartridges, with the same orientation, in succession to a sensing station whereat the one of a plurality of oscillatable sensing and pick-up arms which senses the presence of a notch is activated to pick up the cartridge from the sensing station and carry it to one of a plurality of points of deposition corresponding to the identifying notch of the sensed cartridge.

---

This invention relates to selection and sorting apparatus. It is particularly directed to apparatus for selecting and segregating film cartridges or magazine components having contents of various types that may be delivered in intermingled relationship to a sensing station prior to processing. Usually film for exposure in both still and motion picture cameras is sold in cartridges in which the unexposed film is coiled. It is unwound from a supply roll as it is exposed and, following exposure, it is then wound on a take-up core within the cartridge. Certain types of film are for black-and-white image reproductions. Other types are for color. Each film type is usually processed and developed differently.

It is customary for the purchaser of the film to return it to a processing laboratory for developing and processing following its exposure. The developing work is usually done in darkrooms where manual or visual observation selections of different cartridge or film magazine types become difficult. Further, selection by direct observation or by manual choices is difficult and tiring, particularly where the distinctions between different film types, judged from the cartridge appearance, are minor although extremely significant. Rapid sorting with a degree of accuracy which will even surpass human inspection and selection is particularly important in any operation. This is achieved mechanically and with great rapidity by the apparatus forming this invention.

The significant processing code identification for different film types simplifies the selection, for instance, of the individual cartridges with regard to film speed and type. The code is often provided by one or more notches formed in at least one side wall of the cartridge. Each cartridge is usually square or rectangular in shape and approximately an inch or less in thickness. The code identification notch arrangement is ordinarily formed to occupy but a limited space along one cartridge wall.

Selection and sorting according to the present invention is achieved by locating a series of film cartridge pick-up arms to move adjacent to and then across a notched cartridge. In accordance with the registry by like relative positioning of the pick-up arms and the cartridge notches, selection may be made by one of the pick-up arms. Normally, the film-containing cartridges of intermingled types are transported to a sensing station by any appropriate form of conveyor, with the film cartridges arranged in file formation and similarly oriented. At the sensing station, the cartridge motion is arrested either by bringing the cartridge to a stop position, which will stop the movement of the conveyor, or the lead cartridge to be sensed is temporarily held by any suitable stop means and the moving conveyor is permitted to slide beneath it.

According to one preferred operation, a series of film-containing cartridges is moved along by a conveyor to the sensing station. The conveyor is normally driven by any appropriate drive means with a stopping and starting clutch and brake unit connected between the driving and driven elements to control the conveyor movement. The significant feature is that as each film cartridge reaches the sensing station a motion-limiting component of some type is activated and the cartridge motion is immediately halted. Where the conveyor motion is halted it is usually done either by a declutching control or by an applied braking means or by a combination of both.

Sensing arms of a number corresponding to the number of possible cartridge notch locations are arranged to move as a group adjacent to the sensing station and then, with stoppage of the cartridge motion, these arms align themselves so that one of the arms is permitted to extend its path of movement slightly, thereby to register within a cartridge notch. Registry of a sensing arm within a cartridge notch moves a normally inoperative cartridge-gripping means on that sensing arm to an operative state. Each time a cartridge-gripping means is carried to an operative state, it functions to hold the selected cartridge to the selecting arm until a subsequent positively controlled release operation occurs.

The sensing arms normally pivot as a group with inner ends constituting the fulcrum point and the outer end of each arm describing a generally reciprocating (although somewhat arcuate) or back-and-forth path which terminates at one end at the sensing position and at the opposite end at a cartridge release and transfer position. A preferred form of the pick-up mechanism utilizes the cartridge sensing arms in a substantially parallel relationship to each other at a region adjacent to the cartridge at the sensing or selecting position. The arms are moved about pivot points from the sensing position normally to fan outwardly from each other at the opposite end of the motion path. The outwardly fanning motion of the arms makes possible easy sorting of the selected cartridges one from the other at the discharge end of the arm movement. Cartridge separation is brought about following selection, with the fanning out movement taking into account the cartridge size, whereas at the point of cartridge selection at the opposite end of the arm movement only a single cartridge position is involved and the test there becomes one of establishing the identification notch position and not the cartridge release.

Drive for the entire assembly is normally provided by so arranging the arm supports that the cartridge transfer and discharge units, which finally receive the cartridges, are supported to turn about a generally arcuate path. The separation between the ends of the path of the release and transfer selecting members at one end of the path is generally at least equal to the cartridge size so that each discharge means is separated from the other by an arcuate distance sufficient to permit each cartridge to be removed from the discharge means without interfering with any other cartridge.

The final cartridge discharge elements are normally provided as generally fork-shaped members which serve to remove the cartridges from the selecting arms.

These forked members are adapted to be rotated under the control of a drive which turns all members in unison. The drive preferably connects the different members through a flexible drive cable medium. All the rotary fork-shaped members are connected to drive their associated pick-up arms by linkages established therebetween in any desired fashion. The movement or rotation of the pick-up forks or cartridge transfer means is so established that once during each rotation the forked elements have their paths brought into adjacent and generally crossing relationship with the pick-up arms. This is achieved by a movement of the pick-up arms at one extreme to carry them between the pick-up forks. As the crossing path relationship is attained, the pick-up forks move from beneath the pick-up arms so that if a cartridge has been gripped by one of the pick-up arms it will be contacted by the moving associated pick-up forked element. The forked element causes the gripping means for the cartridge to release. With this release the continued motion of the forked element causes the cartridge to come to rest upon the forked element where it is held. The transferred cartridge then immediately commences to rotate with the forked element. Following a rotation of the cartridge with the forked element through a limited arcuate path, the surface of the forked member, against which the cartridge originally rested as it was transferred from the pick-up arm, is turned from a position along which the cartridge was originally gravitationally held to a downwardly tilted path thereby to discharge the cartridge gravitationally into a bin or trough adapted to collect cartridges of a single type only.

The connection between the several driven forked transfer elements and their associated pick-up arms which are moved between two limiting positions (one being the pick-up point adjacent to the cartridge as it is moved to the sensing station and the other being an extreme position of cartridge discharge) is provided by a drive link. Each rotary pick-up fork makes approximately a half revolution following final cartridge discharge and the start of another cartridge transfer from the pick-up arm to the forked member.

The rotary forked elements are driven in any appropriate fashion continuously at a preselected rate. The pick-up arms are pivoted at one end in a framework to be capable of oscillating in substantially an arcuate path about the pivot point as a support. Coordination of rotation between each forked element and oscillation of its associated pick-up arm is established through a linkage connecting at one end to a suitably chosen point on the rotary forked element and at the other end to a suitably chosen point on the pick-up arm or an element to which the arm is secured. The end of the link connected to the rotary forked member turns so that the point of attachment turns through a full 360° arc with each rotation of the forked pick-up element. The link connection to the pick-up arm is such that each complete rotation of the forked element drives the connecting link to the pick-up arm to provide oscillatory pick-up arm motion about its support point. The arcuate path extends between the sensing position on the one hand and the discharge or cartridge transfer position on the other hand.

Various arrangements may be used to bring the cartridges into the sensing position. The limiting condition is to reach the sensing position in single file arrangement with all cartridges similarly oriented. As a cartridge arrives at the sensing position, the plurality of pick-up arms move relative to the cartridge so that the particular pick-up arm which is in registry with the processing code notch of the cartridge moves into the notch, as above explained, to grip the cartridge.

From the foregoing, it will be apparent that included among the objects and advantages of the invention are those of providing apparatus for readily sensing code processing identification means on film carrying cartridges and through this sensing transporting the identified cartridge to a sorting region specifically allocated to the particular code notch indicia of the particular sensed cartridge. Other objects and advantages of the invention are those of providing a selecting and sensing structure which is relatively simple in its arrangement and in the inclusion of its component parts and with which sorting is simplified. Other and non-obvious objects and advantages will become apparent from a reading of the following description and the claims when considered in connection with the accompanying drawings in which:

Figure 2:
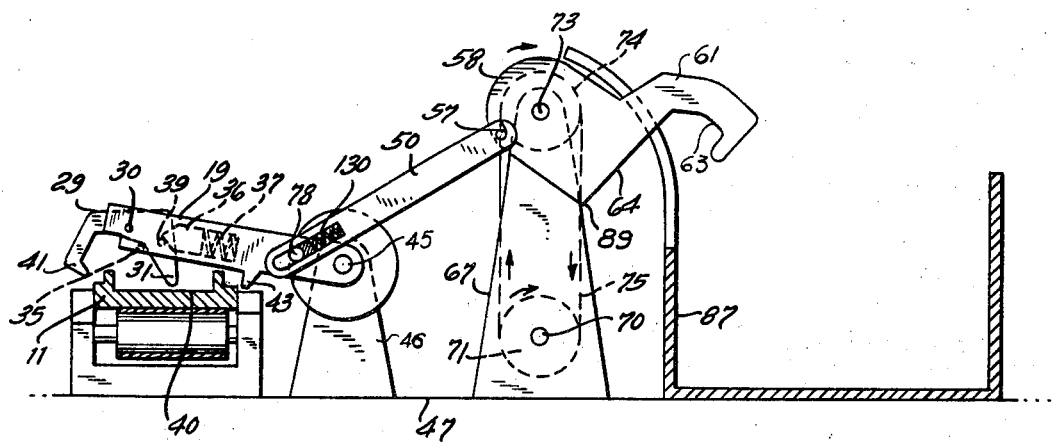
Figure 3:
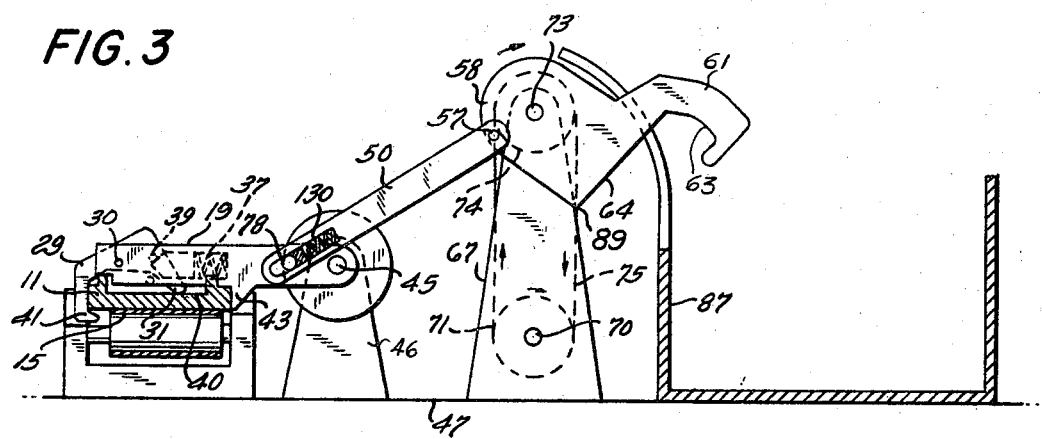
Figure 4:
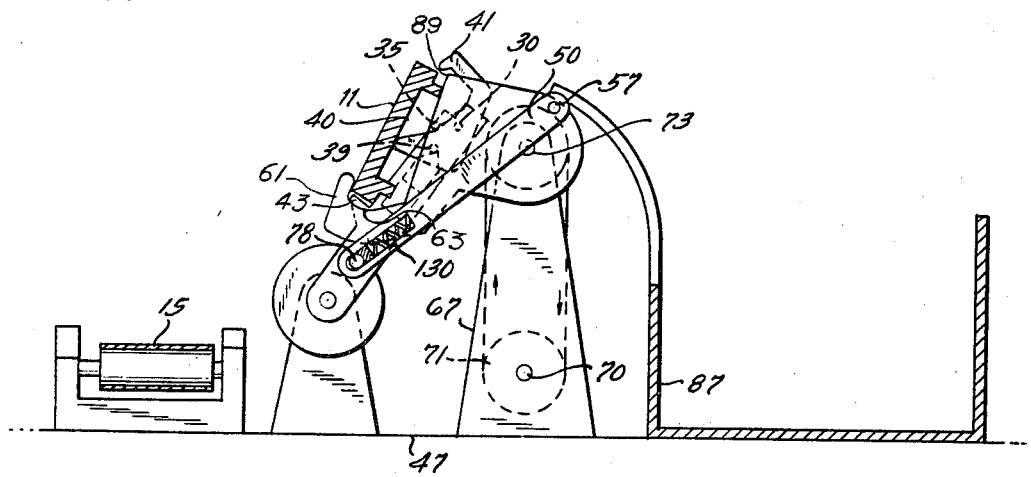
Figure 5:
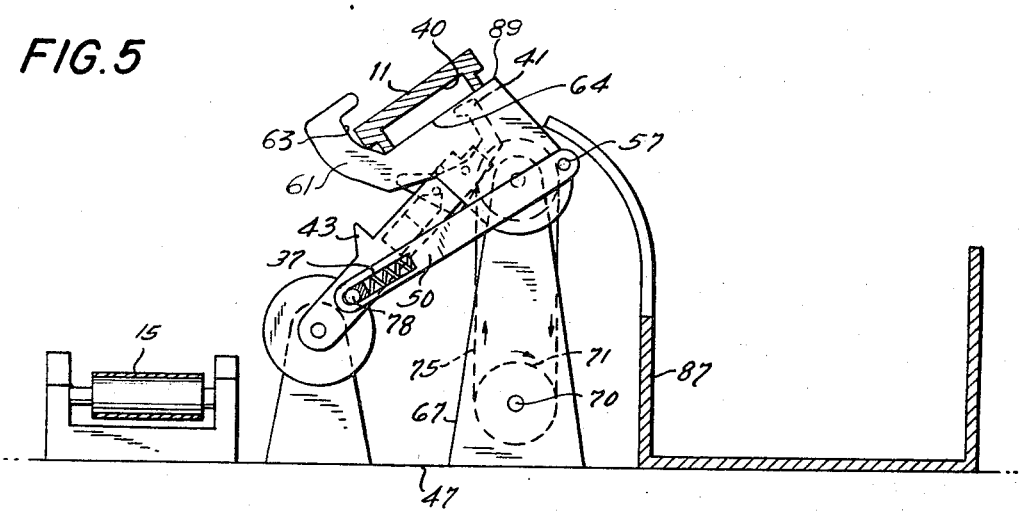

FIGS. 2 through 6 constitute a group of schematic non-scalar representations to depict one of the selection and discharge components of the apparatus in five different positions it will assume in making the selection of a cartridge and transferring it to a given discharge point. Of this group of figures, FIG. 2 depicts the relationship between a forked transfer and discharge means and its associated pick-up arm, with the pick-up arm position being unrelated to the code notch identification of a particular cartridge positioned therebeneath so that the pick-up arm is maintained in a position above the cartridge and its cartridge-gripping means at the end of the pick-up arm is retained in the normally inoperative state;

FIG. 3 is a view generally similar to FIG. 2 except that the pick-up arm is moved to a lower position than in FIG. 2 to identify a code notch position and thereby activate the cartridge-gripping means to an operative state to grip the cartridge element and hold it to the outer end of the pick-up arm;

FIG. 4 is a representation of a further step in the sequence following the gripping of the cartridge, as in FIG. 3, with the FIG. 4 arrangement showing the previously picked up and gripped cartridge being disengaged from the gripping means under the control of a forked transfer element, with the cartridge being held only gravitationally to the pick-up arm against which it was originally tightly gripped;

FIG. 5 represents a further step in the sequence of operation showing the forked transfer element having removed the cartridge from engagement with the pick-up arm thereby to hold the transferred cartridge gravitationally prior to its discharge against and between the fork tines and with the pick-up arm being shown substantially at the opposite end of its motional path from that at which the cartridge was initially gripped;

FIG. 6 shows the forked transfer element gravitationally discharging the cartridge into a collecting bin following a further degree of its rotation, with the figure also showing the pick-up arm in approximately a midway position between that of the cartridge transfer and the next cartridge pick up; and FIG. 7 is a schematic representation of a conveying means for moving a series of cartridges similarly oriented from a hopper to a sensing station whereat the pick-up arms in parallel array are adapted to select different cartridge elements, depending upon the code notch positions relative to the pick-up arms.

Now, making reference to the drawings for a further understanding of the invention, a plurality of cartridge elements 11 is adapted to be discharged from a hopper 12 (see FIG. 7) in similarly oriented arrangement to a conveyor belt drive 15 adapted to be moved in the direction shown by the arrow. The cartridges, as will later be explained, are moved along by the conveyor belt 15 to come to rest against an insulating region of a switch armature 114 which then abuts a stop element 16. At the rest position the lead cartridge is in a position to be sensed by a series of spaced cartridge pick-up arms 17, 18, 19, 20 and 21. The invention is not limited to the use of five pick-up arms as shown for illustration purposes and which arrangement is adapted for a possibility of selecting between five different code selection notches 23 spaced along the side wall of the cartridges 11, the position of the notch in each cartridge identifying the type of film contained in the cartridge. In the drawings, the notch 23 of the lead cartridge is shown beneath the center pickup arm 19 solely for reasons of illustration. Also, since each of the five cartridge arms (17–21) and their operation are identical, the structure and operation of only one, e.g., 19, will be specifically described. However, corresponding parts of the other arms (17, 18, 20 and 21) and the mechanisms associated therewith which are identical to those associated with arm 19 will be referred to by the same reference numerals.

The inner end of each cartridge arm (17–21) is pivoted about its own axis, such as 45, to oscillate between a sensing position (FIG. 3) and a cartridge transfer position (FIG. 5). The outer end of each arm which rests above a cartridge 11 on the conveyor belt 15 in the sensing position is relatively narrow and of a size adapted to drop into the cartridge notch 23. As can be seen particularly in FIG. 1, each cartridge 11 is provided along one edge with a raised rib section 27 within which notch 23 may be located at one of a number (in this instance 5) positions spaced along the rib, the notch position identifying the type of film contained in the cartridge. The range of notch positions will be within the bounds embraced by the generally parallelly arranged arm sections of the pick-up arms 17 through 21. As the outer end of the pick-up arm 19 is permitted to extend its motional path to enter into the notch 23 (see FIGS. 1a and 3) it drops downwardly to a position such that a toggle element 29 will be moved about its pivot point 30 by virtue of the rear prong 31 contacting the upper surface 40 of the cartridge 11 on the conveyor at the sensing station.

The toggle 29 had been held in its inoperative position (note the position shown in FIGS. 2 and 6) by virtue of a spring-pressed pin 36 being pushed forward by a spring 37 so that its generally pointed end 38 moves into engagement with the top side of a pin member 39 extending from toggle 29 to releasably lock the toggle in its inoperative position. Contact between the prong 31 and the upper surface 40 of a cartridge 11 forces the pin 36 backwardly by reason of the pressure applied against it by the pin 39. The forward end of the pin acts generally as a cam surface while being pushed rearwardly. As the pin 39 passes beyond the pointed end 38, the spring-pressed member again forces itself outwardly tending to move into engagement with the underside of the pin 39. This action pivots the hooked end 41 of the toggle 29 to move in a counterclockwise direction about the pivot point 30 (looking at FIGS. 1a and 3, for instance) until the hooked end 41 overhangs the lower edge of the cartridge 11. This action shifts the cartridge very slightly laterally so that its inner edge rests against a flattened detent 43 on the outer end of the pick-up arm. This gripping action is sufficient to hold the cartridge tightly to the outer end of the pick-up arm 19 and, with movement of the pick-up arm along a path between the pick-up point on the belt and a transfer point later to be discussed, the cartridge will be held tightly until released. As mentioned above, the inner end of the pick-up arm 19 (or any other pick-up arm) is supported for oscillatory movement about a pivot axis 45 which, in turn, is carried from a bearing support 46 fixed to a base member 47.

Figure 1:
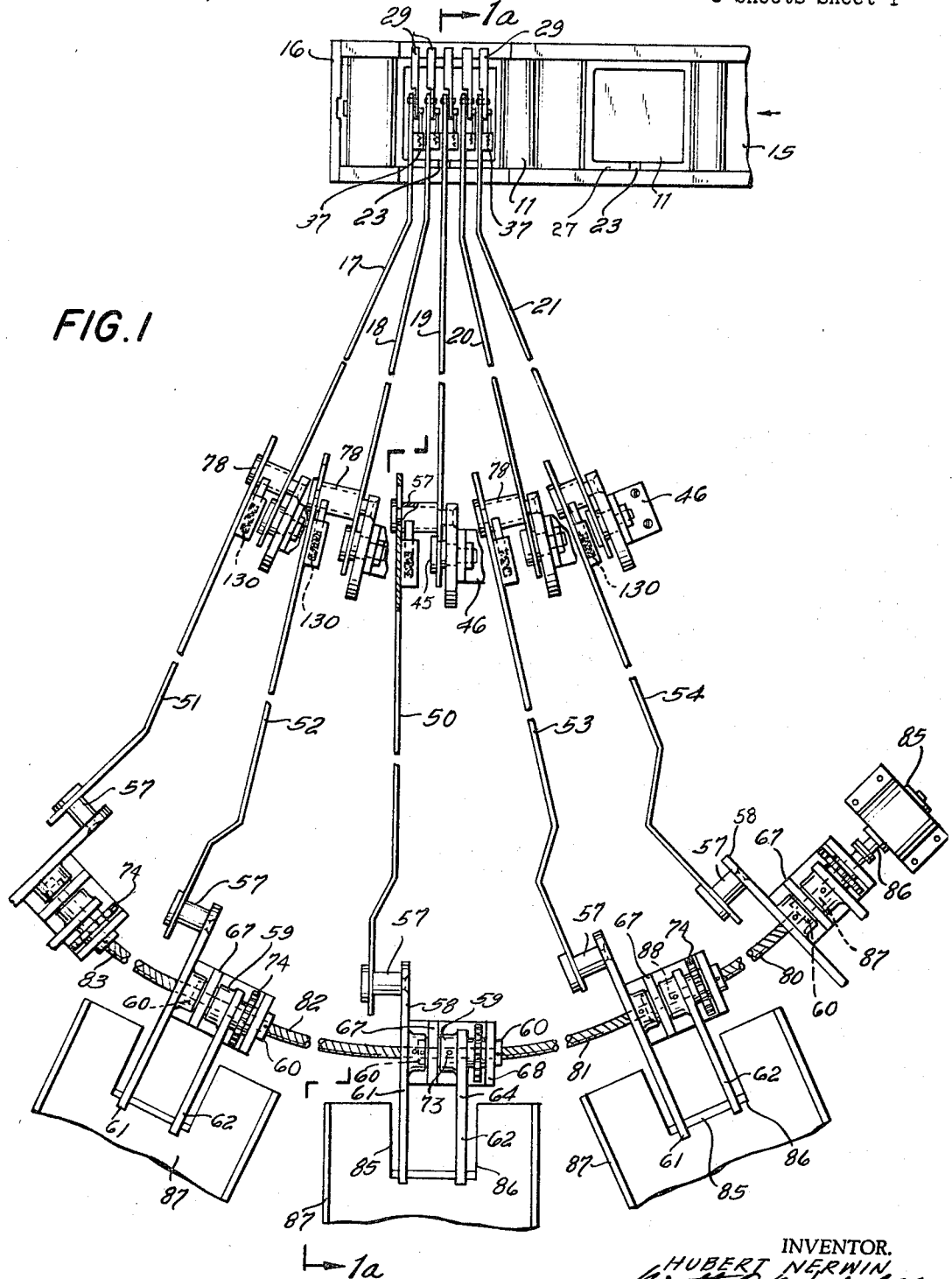
FIG. 1 is a top plan view of a portion of the sorting mechanism with the pick-up arms in a cartridge-sensing position.
Figure 1A:
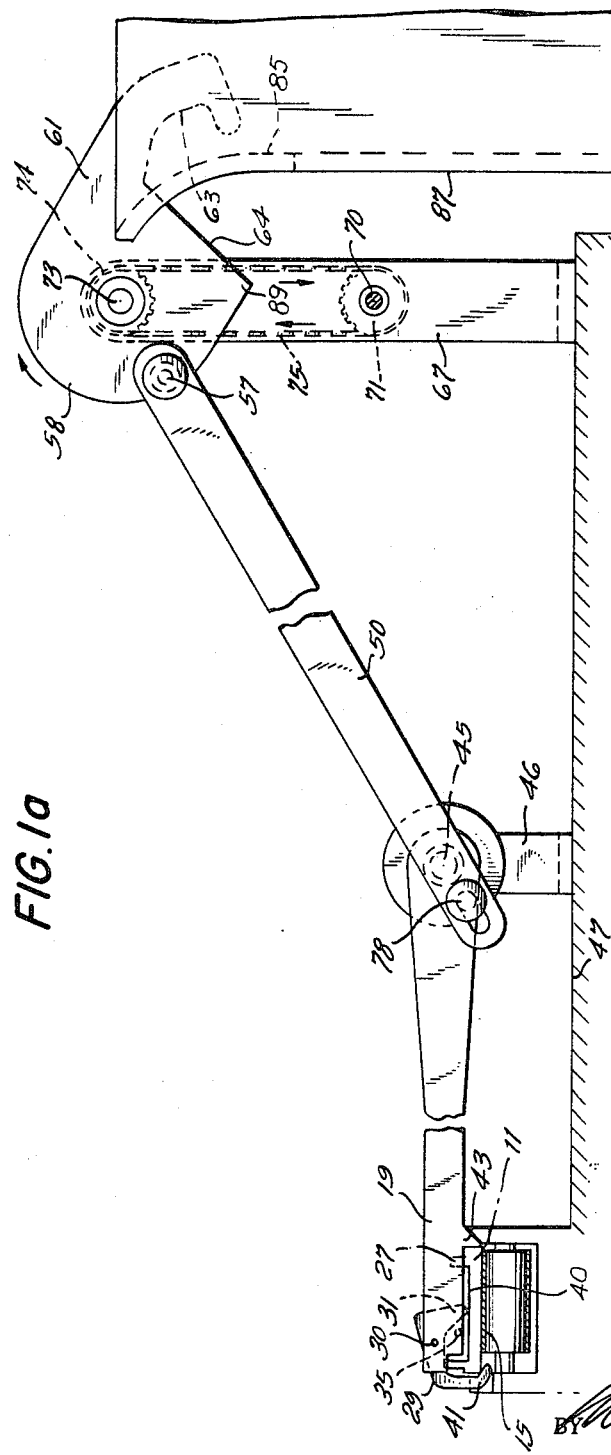
FIG. 1a is an elevational view taken substantially on the line 1a—1a of FIG. 1 looking in the direction of the arrows to show the pick-up of a selected cartridge, with the apparatus having its pick-up arm in a position to pick up a cartridge and its discharge element in a position where it would have discharged any cartridge previously selected by its associated pick-up arm.

The arm is moved under the control of a connecting link 50 (similarly arms 17, 18, 20 and 21 will be moved by similar connecting links 51, 52, 53 and 54, for instance, and will not be further discussed) which connects to the outer end of a bearing pin 57 attached to one side of a divided or forked transfer element 58, see FIG. 1. The forked transfer element comprises a hub section 59 from which a pair of spaced arms 61 and 62 of the shape best shown in FIG. 1a extend outwardly. Each of these arms has a straight surface 64 blending into a curved surface 63 against which the cartridge in tranfer is adapted to rest, prior to its discharge, as will be explained.

The forked transfer member 58 is journalled at the top of a pair of spaced uprights 67 and 68. A bearing member 60 is carried by each upright and rotatably mounted in these bearing members is a solid drive shaft 73 to which is fixed the arms 61 and 62 held together by hub 59. For rotating transfer member 58 shaft 73 is driven from a shaft 70 immediately below the shaft 73, by means of a drive chain 75 engaging sprockets 74 and 71 fixed to shafts 73 and 70, respectively, see FIG. 1a. Rotation of the member 58, causing the pin connection 57 to describe a circular path, provides a drive through the link 50 to the arm 19. The link 50 connects at the pin 78 to the arm 19 so that as the pin 57 rotates to describe a circular path it causes the arm 19 to oscillate about the axis 45 as a center thereby to describe an arcuate movement which, as will later be seen, extends between substantially the positions shown in FIGS. 3 and 5.

The drive between the link 50 and the pin 78 is provided through a slotted connection. The spring element 130 is supported in this slot to continuously maintain a tight fit between the link and the drive pin. The connection of the link 50 at the point 57 to the rotary forked transfer and discharge element 58 is at a slightly different radial distance from its center of rotation than is the pin 78 relative to the axis 45. Therefore, at the extreme of motion of the link 50 in a position beyond the center of rotation of the element 58, a slightly longer radius is required. The spring pressed member 130 provides this form of connection.

The code notch positions of cartridge 11 are sensed as by the substantially parallel portions of the pick-up arms 17 through 21 when they are adjacent to the cartridge (see FIG. 1). As already mentioned, these arms spread outwardly as they are moved away from the sensing position (see FIG. 1). The cartridges are picked up from the conveyor 15 one at a time by way of one of the arms 17 through 21. The arms then move to carry the cartridge in an arcuate path from the pick-up point (FIG. 3) to a position where it is later transferred to one of the forked transfer means 58, 61, 62, see FIG. 4.

Because of the size of the cartridge, the transfer means must be spread apart one from the other as compared to the sensing position, as shown in the lower portion of FIG. 1. This is achieved by radially spreading the outer ends of the arms 17 through 21 to connect with the link members 50–54 and then by similarly spreading the link members to connect with one of the fork-like transfer elements 58, 61, 62 which are arcuately spaced apart. With all drives necessarily coordinated in speed and timing in order that all pick-up arms shall be in a sensing position relative to the cartridge at the same time, all rotary or oscillatory components are synchronized. One conventional way to provide synchronization of the driving of all the components is provided by the linkage between the rotary forked-transfer and discharge elements. The drive for all of the five (5) forked elements is provided by way of a flexible cable connection 80, 81, 82 and 83 with a motor 85 driving first a shaft 86 connected through a shaft 87 to turn the forked transfer and discharge element 58 connected to the link 54. The opposite end of the shaft 87 connects through a suitable bearing connection to the flexible shaft 80. Shaft 80, in turn, connects to a shaft 88, similar to the shaft 87. Shaft 88, in turn, connects to the flexible cable 81 at its left-hand end looking at FIG. 1. The flexible shaft 81 then connects to the next adjacent drive in similar fashion.

The connections between the outermost ends of the arms 50 through 54 are substantially offset relative to the inner ends of the forked transfer elements 58 by way of pin connections similar to those shown at 57. This is in order that the inner end of the arms may clear all of the rotary components of its associated forked transistor and discharge element as it rotates. Similarly, as can be seen, the curved ends 63 of the arms 61, 62 of the forked transfer elements pass through slotted sections 85 and 86 of discharge bins 87. The wall section of the discharge bins is slotted sufficiently far down to permit the outer end of the arms 61, 62 to move therethrough and yet, to provide for the bins 87 collecting any cartridges discharged from its associated forked element.

Considering the foregoing apparatus now from the purely schematic viewpoint, reference may be made to the schematic representations in FIGS. 2 through 6. In these figures it will be understood that for the sake of space saving the components are shown merely in relative positions and not in any necessarily practical scale as in FIGS. 1 and 1a. The showings of FIGS. 2 through 6 are to illustrate the principle of operation rather than to depict the precise relative sizes of the components under consideration. Accordingly, it will be understood that principlewise, the components rotate and oscillate in the general fashion shown by FIGS. 1 and 1a but the precise path followed is merely illustratively presented.

If reference is made now first to FIG. 2, it will be apparent that the pick-up arm 19 carrying the gripping toggle 29 will be unable to grip any cartridge as the arm moves above the cartridge. This is because of the fact that if the cartridge 11 positioned immediately beneath the arm lacks a code notch arrangement which registers with the arm then the arm will not be permitted to drop to a level where the prong 31 contacts the upper surface 40 of the cartridge. Hence, the gripping toggle will be continually held in an inoperative condition by reason of the contact established between the pin 39 and the detent 36. Under these circumstances, with a continued rotation of the fork-shaped transfer and discharge element 58 the pick-up arm will be oscillated in the already described path but even when it reaches its transfer position where its path of movement generally overlaps that of the forked transfer and discharge element, there will be no cartridge carried by it to be transferred.

Considering now the showing of FIG. 3, the cartridge 11 is shown as having a notch in the side wall thereof located in a position such as to permit the lower edge of the arm 19 to move inwardly of the cartridge wall to a position such that the prong 31 comes to bear upon the upper surface 40 of the cartridge. As already explained in connection with FIG. 6, the hooked end 41 of the toggle 29 is then moved downwardly around the edge of the cartridge 11 with the movement of the point bringing it immediately below the cartridge bottom (see FIGS. 1a and 3) so that the cartridge is held tightly between the hook end 41 and the detent 43. Under these circumstances, arcuate movement of the arm 19 about its pivot axis 45 under the control of the drive link 50, as driven from the forked transfer and discharge element 58, carries the cartridge with it, after first having removed the cartridge from the conveyor 15 by reason of the gripping action established. Continued rotation of the pick-up arm 19 to move the gripped cartridge to the position shown in FIG. 4 with the cartridge than resting gravitationally against the detent 43 finally brings the pick-up arm to a position whereat the corner 89 of the forked transfer of the toggle and discharge element 58 engages and pushes the upper edge of the cartridge outwardly against the end 41 of the toggle 29 and cams the toggle to a cartride releasing position. This not only releases the toggle gripping means but returns it to its normally inoperative position as shown by FIG. 2. At this point it is worth noting that the pin 35 will engage and prevent the toggle 29 from turning beyond the position (with clockwise rotation) shown in FIGS. 2, 4 and 6 even though the push given the cartridge by the corner 89 of transfer element 58 might tend to move the toggle further than this.

With this condition obtaining, the cartridge 11, which has been released from the gripping member, is then picked up by the rotary forked transfer and the discharge element 58. One edge of the cartridge (that is the edge in which the notch originally appeared) comes to rest against the curved surface 63 of the arms 61 and 62. This contact lifts the cartridge as a whole and removes it from its rest position against the detent 43 and immediately transports the cartridge, with rotation of the forked transfer and discharge element, to a position where the cartridge rests upon the straight surface 64 of the arms 61 and 62 of the transfer element 58, as shown by FIG. 5.

This figure also shows, as above explained, approximately the second limit of motion of the pick-up arm 19 (or other pick-up arm). With continued rotation of the transfer and discharge element 58, as above stated, the pick-up arm 19 is returned to its original position by the drive link 50. As soon as the surface 64 tilts downwardly, as shown by FIG. 6, the cartridge 11 slides off the surface 64 into that one of the collecting bins 87 associated with arm 19. Had the notch 23 on the cartridge 11 been in a position other than that assumed above so that, for instance, the cartridge would have been picked up by the arm 20, it is apparent that the same type of operation would have been followed but the cartridge would then have been grasped by pick-up arm 20 to be transferred to a different forked transfer member 58 and discharged finally into a different cartridge collecting bin 87, namely that bin associated with pick-up arm 20.

The selection of the cartridge, accordingly, is completely machinewise without the necessity of manual control. The selection of the cartridge and its discharge to the proper one of the cartridge collecting bins is controlled solely in accordance with the notch position on the cartridge wall which determines which of the pick-up arms happens to grip the cartridge.

The catridges may be fed to the sensing position in any desired fashion. The showing of FIG. 7 is purely schematic of one suitable form. In this figure, the group of cartridges is fed successively from a discharge hopper 12 to come to rest upon the conveyor belt 15. All of the cartridges are similarly oriented so that, for instance, the code notches in the cartridges wall will all face in the direction of the viewer. The cartridges normally may be positioned precisely adjacent to each other as the conveyor belt is moving. The conveyor may be driven in any desired fashion from a drive motor 106 driving through a magnetic clutch and brake schematically shown but of any well known and recognized type which, then, through the shaft connection 108, drive a drive roller, pulley or gear 109 which, in turn drives the belt 15. The belt path is that indicated as being between the positions of the drive roller 109 and the driven roller 110 about which the belt turns.

The cartridges move along on the conveyor belt 15 with motion supplied by the drive shaft 108 until they reach an end stop 16 at the sensing station. At this time, the forward end of the leading cartridge also contacts a switch armature 114 which is pivoted at some point, such as 115. The armature, as a rule, is preferably a spring-like insulating element which has a conducting strip 118 to establish connection from a suitable source of current 116 and conductor 117 in the section of the switch arm 114, between the contact point 118 and pivot point 115. The conductor 119 leads from the contact 118 to one side of the magnetic clutch and brake element, conventionally shown at 107, thereby to energize or deenergize the arrangement in accordance with the condition of the switch 118. The other side of the clutch and brake element 107 connects with the source 116 by way of the conductor 121.

Contact between the leading cartridge element 11 and the switch arm 114 due to the motional effect provided by the moving belt is sufficient to open the switch 118 and temporarily open the circuit to the combined magnetic clutch and brake thereby to immediately stop or interrupt the movement of the conveyor belt for the period of sensing by the pick-up arms 17 through 21. As soon as the selection has been made by one of the pick-up arms and one arm operates to remove the cartridge upwardly from the conveyor 15, the spring element 127 immediately moves the switch arm 114 back to a position where it closes switch 118 whereby the conveyor again starts. The motion of the conveyor then continues until the next succeeding cartridge moves to the end of the conveyor path at the sensing station whereupon the conveyor drive is interrupted by the opening of switch 118 as indicated in FIG. 7.

Various other forms of drives and connection may be used and substituted as is necessary. The conveyor drive speed should be sufficient to provide for moving a cartridge into the sensing position following a starting of the conveyor prior to the time the pick-up arms can move from and back to the pick-up position after a given cartridge is sensed. This time period can be closely coordinated to the exact time required for the arm movement or it can be faster with a longer rest period.

Although the invention has been described in considerable detail with particular reference to certain preferred embodiments thereof, variations and modifications can be effected within the spirit and scope of the invention as described hereinbefore and as defined in the appended claims.

I claim:

1. Apparatus for sorting cartridges having an identifying code notch at a given one of an *n* number of different positions, and wherein the cartridges are adapted to be moved in sequence, and similarly oriented, to a sensing station whereat the motion is arrested for cartridge identification, which comprises in combination:

an *n* number of sensing and pick-up arms, said arms being spaced relative to each other such that a portion of each arm is adapted to engage a different one of said code notches in a cartridge at the sensing station;

a normally inoperative cartridge-gripping means on each pick-up arm;

means for oscillating said arms as a group between a sensing position adjacent to a cartridge at the sensing station and a cartridge-transfer position remote from said sensing station;

means to activate to an operative state the cartridge-gripping means of the arm instantaneously identifying itself with a cartridge code notch at a time when the arm is moved to its sensing position whereupon the cartridge is removed from said sensing station and carried by said arm to its transfer position;

an *n* number of cartridge-transfer means;

means for moving each of said cartridge-transfer means as a group along separte paths a part of wrich overlap said transfer position of one of said pick-up arms, the pick-up arms and transfer means being adjacent and in noncontacting relationship to each other at the portion of overlap of the motional paths;

means for releasing the cartridge-gripping means and shifting a picked-up cartridge from the pick-up arm to the transfer means when the pick-up arms and the transfer means are in a path-overlapping position; and means at a second position along the path of movement of each transfer means for ejecting the transferred cartridge therefrom and along a path identified with only cartridges having like code notch identifications.

2. The apparatus as claimed in claim 1, in which each of said cartridge-transfer means moves in a circular path and comprising in addition, means for synchronizing the means for oscillating said pick-up arms and the means for moving said cartridge-transfer means so as to provide one complete rotation of the transfer means during one oscillatory movement of the pick-up arms between their two positions.

3. The apparatus as claimed in claim 2, in which said last-mentioned means comprises a driving link means connecting each rotating transfer means with its associated oscillatable pick-up arm.

4. The apparatus as claimed in claim 1, in which said cartridge transfer means lie along an arc substantially concentric to said sensing station and are spaced from one another by an amount such that any one of said transfer means can receive a cartridge from its associated pick-up arm without interference from a transfer means immediately adjacent thereto.

5. The apparatus as claimed in claim 3, and including drive means for synchronously rotating said cartridge-transfer means.

6. The apparatus as claimed in claim 5 in which said cartridge-transfer means lie in spaced relation along an arc substantially concentric to said sensing station, and said drive means comprises a flexible drive connecting arc of said transfer means for synchronous rotation; and a single prime mover for said flexible drive.

7. The apparatus as claimed in claim 2 wherein the transferred cartridges are held freely and by gravity on the transfer means at the point in its arcuate path where transfer occurs and, with continued rotation of the transfer means, are subsequently permitted to fall by gravity along said path identified with only cartridges having like code notch identifications.

8. An apparatus for sorting objects according to identification means selectively located at one of *n* different positions along at least one edge of the object and wherein the objects are adapted to be moved in a file array sequentially into a sensing location whereat identification of the object is made, comprising in combination:

an *n* number of sensing and object pick-up arms;

means to move the arms as a group along individual paths between an identification means sensing position and a transfer position;

a normally inoperative object-gripping means on each arm;

means responsive to an arm sensing an identification means on an object for activating the gripping means associated with said arm whereupon the object will be moved from said sensing location to said transfer position by said arm;

an *n* number transfer means;

means for cyclically moving the transfer means as a group along individual paths between a pick-up position, wherein each transfer means will pick up an object from its associated arm when the latter is in its transfer position, and a discharge position, wherein each transfer means will release an object picked up from its associated arm;

means for moving said arms and transfer means over their respective paths of movement in synchronism;

means operative at the transfer position of each of said arms for releasing an activated object-gripping means prior to its being picked up by the associated transfer means; and an *n* number of collecting means for receiving objects released by said transfer means at their discharge positions.

9. An apparatus for sorting objects according to identification means selectively located at one of *n* different positions and wherein the objects are adapted to be moved in a file array sequentially into a sensing location whereat identification of the object is made, comprising in combination:

an *n* number of object collecting means;

an *n* number of sensing and object pick-up arms mounted to oscillate along individual paths between an identification means sensing position, wherein one end of each arm moves into engagement with the object at the sensing location to sense for the presence of a particular one of said identification means and the arm sensing the presence of an identification means has a different degree of movement than said other arms, and an object transfer position, wherein an object picked up by one of said arms sensing the presence of one of said identification means is discharged into the proper one of said collecting means;

a normally inoperative object-gripping means on each arm which is activated to grip an object in response to an arm sensing the presence of an identification means;

means for inactivating any activated object gripping means of an arm in response to said arm reaching its transfer position, whereupon an object carried by said arm is discharged into one of said collecting means; and drive means for oscillating said arms over their individual paths of movement as a group between their sensing and transfer positions.

References Cited

UNITED STATES PATENTS 3,366,248   1/1968   Sedgwick et al. _____ 209—80

ALLEN N. KNOWLES, *Primary Examiner.*